United States Patent [19]

Nakaji

[11] Patent Number: 4,578,701
[45] Date of Patent: Mar. 25, 1986

[54] METHOD OF RECORDING AN OPTIONAL NUMBER OF COLOR SEPARATION IMAGES IN AN OPTIONAL ORDER AND IN OPTIONAL POSITIONS ON A RECORDING MEDIUM

[75] Inventor: Etsuo Nakaji, Shiga, Japan

[73] Assignee: Dainippon Screen Mfg. Co., Ltd., Kyoto, Japan

[21] Appl. No.: 518,837

[22] Filed: Aug. 1, 1983

[30] Foreign Application Priority Data

Nov. 1, 1982 [JP] Japan .................. 57-192897

[51] Int. Cl.$^4$ ............................... H04N 1/46
[52] U.S. Cl. ........................ 358/78; 358/75
[58] Field of Search .............. 358/75, 77, 78, 79, 358/80

[56] References Cited

U.S. PATENT DOCUMENTS 3,878,559 4/1975 Pugsley .................. 358/78
4,315,280 2/1982 Tsuda .................... 358/80
4,454,537 6/1984 Okada et al. ............ 358/77

FOREIGN PATENT DOCUMENTS

18601 5/1977 Japan .
1321721 6/1973 United Kingdom .
2062396 5/1981 United Kingdom .

Primary Examiner—James J. Groody
Assistant Examiner—Randall S. Svihla
Attorney, Agent, or Firm—Lowe King Price & Becker

[57] ABSTRACT

In a color separation image reproduction system, the unrecorded area of a photosensitive film is minimized by providing for recording the color separation images on the film in arbitrarily selectable order and position. Only the necessary color separation images are recorded on the film, so that film area is not recorded with unnecessary images. Different size images are accommodated in the inventive system by a pulse generation circuit which, by sectioning of a pulse sequence representing a scanning cycle, determines appropriate order and position of the images.

21 Claims, 7 Drawing Figures

METHOD OF RECORDING AN OPTIONAL NUMBER OF COLOR SEPARATION IMAGES IN AN OPTIONAL ORDER AND IN OPTIONAL POSITIONS ON A RECORDING MEDIUM

FIELD OF THE INVENTION

This invention relates to a method of utilizing unused area of a film (herein, the word "unused" means both a condition wherein parts of a photosensitive film recorded with images are not used for some reasons and a condition wherein parts of a photosensitive film having no recorded image thereon are not used) for recording in order to make full use of the film in a image reproducing system such as a color scanner which obtains color images from scanning of an original color picture.

BACKGROUND OF THE INVENTION

Conventionally, a photomechanical camera is used for separating color components of an original color picture.

Recently, in response to a need for higher resolving ability and color reproducing certainty, an image reproducing system called a color scanner has been put to practical use. As the size of the film is standardized, sometimes unused area is produced depending on desired size of reproduced images.

If the width of the unused area is within a few centimeters, the film can be considered to be effectively used. But in actual situations, there remain rather broad unused areas on a film, and only a very limited part of the unused area is utilized. To overcome this problem the simultaneous color separation procedure, using a plurality of original pictures for recording a film, can be considered. However, this method is not practical because the color tone, density and magnification factor of each original picture must be approximately unified, which requires limited combinations of original pictures.

As a solution for the above problem, a color scanner capable of simultaneously recording on a film a set of color separation images is put into practice and disclosed in Japanese Examined Patent Publication (Kokoku) No. 52-18601. However even the described color scanner has a defect with respect to effective use of a film as follows. Even when respective four color components Y, M, C, and K of original pictures H and I, and the yellow color separation image ($A'_Y$) of the original picture A are required to be produced on a film, said color sanner cannot perform a recording operation in which the other color separation images $A_M$, $A_C$, and $A_K$ are eliminated as shown in hatched area of FIG. 1(a). Still further, hatched areas shown in FIG. 1(c), (e), and (g) are not utilized in an actual process of recording films.

SUMMARY OF THE INVENTION

This invention is thus made to overcome the aforesaid defects by providing an approach to recording a film with an optional number of color separation images which are optionally distributed in order and in positions in one scanning cycle controlled by section pulses which designate proper scanning timings.

Moreover, by using said section pulses, some test pattern signals can be output.

The above and other objects and features of this invention can be appreciated more fully from the following detailed description when read with reference to the accompanying drawings.

PREFERRED EMBODIMENT OF THE INVENTION

The following is an explanation of the principle of this invention based on the drawings. FIG. 2 is a timing chart in recording the image shown in FIG. 1(b).

Figure 1:
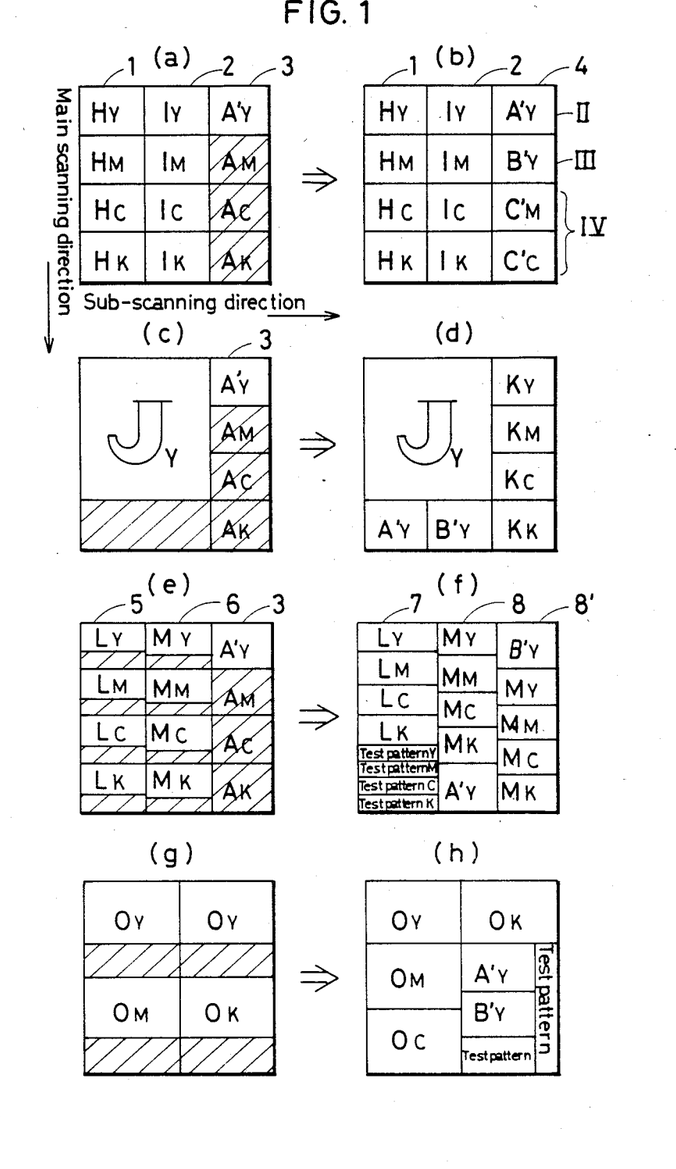
FIG. 1 shows a plan view of films in which a manner of using films according to the present invention is compared to a conventional method of using films.
Figure 2:
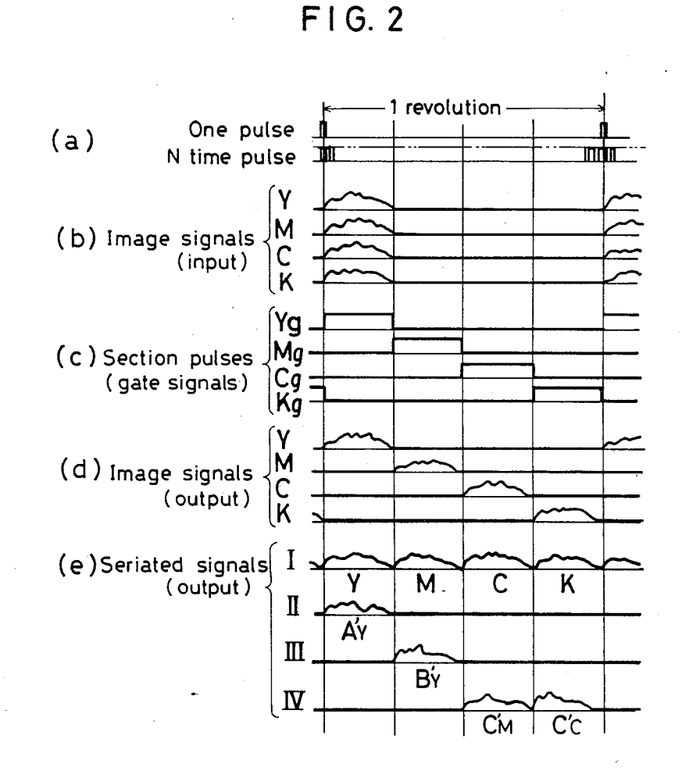
FIG. 2 is a timing chart of the principle of this invention.

FIG. 1(b) shows color separation images $B'_Y$, $C'_M$, and $C'_C$ distributed in place of the color separation images $A_M$, $A_C$, and $A_K$, shown in FIG. 1(a), when only the color separation image $A'_Y$ of the original picture A is needed and the color separation images $A_M$, $A_C$, and $A_K$ are not necessary.

At first, a film is placed on a recording drum of a scanner (not shown in the drawings).

A rotary encoder is coaxially connected to the recording drum, and the rotary encoder generates one pulse and N time pulses for each revolution of the recording drum as shown in FIG. 2(a).

Color separation signals Y, M, C, and K obtained in parallel from an input device of a color scanner simultaneously are stored into a memory as shown in FIG. 2(b). The thus stored color separation signals Y, M, C, and K are then read as shown in FIG. 2(d) in response to section pulses $Y_g$, $M_g$, $C_g$, and $K_g$. The latter are gate signals obtained from sectioning N time pulses—that is, from choosing time periods represented by sections, or given numbers of pulses, of a pulse sequence N having a particular pulse repetition frequency, as shown in FIG. 2(c). Alternatively, the gate signals may be obtained from sectioning $N_0$ pulses. These pulses are provided at a frequency which is a multiple of the frequency of the N time pulses. As a result, a seriated image signal I consisting of color separation signals of original pictures such as H and I are produced. By using such signals, Area 1 ($H_Y$, $H_M$, $H_C$, $H_K$) and Area 2 ($I_Y$, $I_M$, $I_C$, $I_K$) are recorded on a photosensitive film.

A seriated image signal II shown in FIG. 2(e) means the output timing for reproducing the image $A'_Y$ shown as Area 4 in FIG. 1(b) is controlled only by the timing of gate signal $Y_g$. Similarly, only the gate signal $M_g$ provides timing for reading the data of image $B'_Y$ to make a seriated signal III, and the gate signals $C_g$ and $K_g$ provide timing for reading the data of images $C'_M$ and $C'_C$ respectively to make a seriated signal IV shown in FIG. 2(e).

In order to record Area 4 of FIG. 1(b) totally, three scans are necessary for each of original pictures A, B, and C as mentioned above.

A conventional method of recording said color separation films $A'_Y$, $B'_Y$, $C'_M$, and $C'_C$ also requires three scans. Comparing the two methods to each other, a significant difference is that the conventional recording method wastes color separation films A'$_M$, A'$_C$, A'$_K$, B'$_M$, B'$_C$, B'$_K$, C'$_Y$, and C'$_K$ while on the contrary the present invention does not waste any part of a film.

Figure 7:
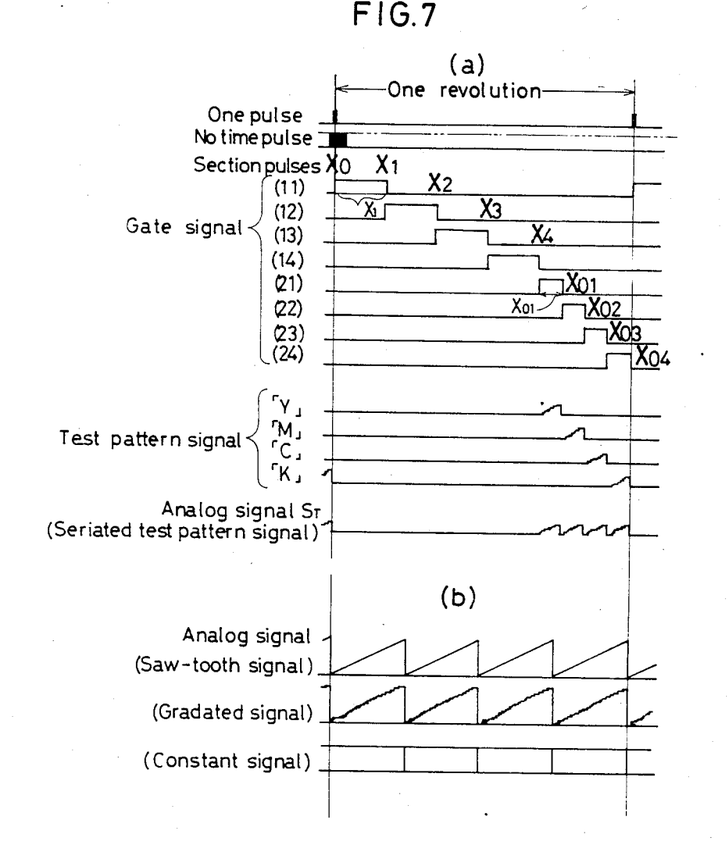
FIG. 7 is a timing chart corresponding to an embodiment of this invention.

This invention is further capable of recording images of several scales on a film as shown in FIGS. 1(d), (f), (h) as well as images of a uniform scale as shown in FIG. 1(b), when of course the gate signals Y$_g$, M$_g$, C$_g$, and K$_g$ must be reformed to have suitable timing and duration for reproducing the color separation images. For example, FIG. 7(a) shows a timing chart of gate signals for recording Area 7 of FIG. 1(f), and FIG. 3 shows an example of a circuit which generates gate signals 11 to 14 and gate signals 21 to 24.

Figure 3:
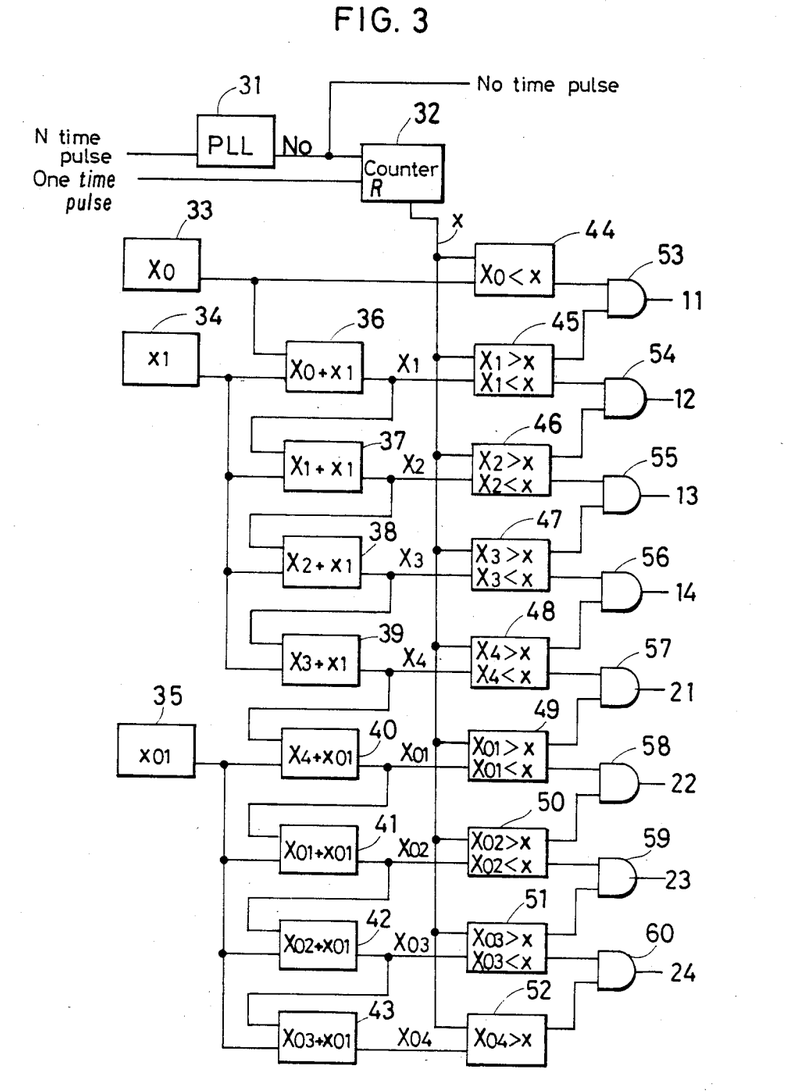
FIG. 3 is a circuit diagram for a circuit for generating section pulses.

Referring to FIG. 3, the N time pulse signal output from the encoder is converted into an N$_0$ time pulse signal which has higher frequency through a PLL circuit 31. A counter 32 counts the N$_0$ time pulses, and after completing one rotation (N times) the one time pulse signal is input to a reset terminal of the counter 32 to re-count the N$_0$ time pulses. A start number setting circuit 33 sets up a counting number X$_0$ for a gate signal (11) as shown in FIG. 7 for recording Y(yellow) color image. Ordinarily, X$_0$ is set to "0", for example as shown in FIG. 1(f). If color separation images M$_y$, M$_m$, M$_c$, and M$_k$ (the hatched area of the Area 3 of FIG. 1(e) are desired to be recorded in the blank below A'$_y$, the counting number X$_0$ is set to N$_0$/4. This number signal is input to a comparator 44 in order to be compared to an output x from the counter 32. When X$_0$<x, an output signal from the comparator 44 becomes "H" to be an input to an AND-gate 53. The number signal of the starting count setting circuit 33 is also input to an adder 36 (mentioned later). The signal duration setting circuit 34 sets up a counting number x$_1$ corresponding to a desired duration for the first set of gate signals and outputs the value into the adders 36 to 39. Output signals from the adders 36 to 38 are respectively input to the adders 37 to 39 successively, so that adders 36 to 39 perform the calculations X$_0$+x$_1$=X$_1$, X$_1$+x$_1$=X$_2$, X$_2$+x$_1$=X$_3$, and X$_3$+x$_1$=X$_4$ respectively and input the calculated results into the respective comparators 45 to 48. The comparator 45 compares said calculated value X$_1$ to the output value x from the counter 32 and when X$_1$>x, a "H" (high) signal is output from the smaller-than signal terminal of the comparator 45 to the AND-gate 53, as a result when X$_0$<x<X$_1$, the gate signal 11 is output from the AND-gate 53. Similarly, when X$_1$<x<X$_2$ the gate signal 12 is output from the AND-gate 54, when X$_2$<x<X$_3$ the gate signal 13 is output from the AND-gate 55, and when X$_3$<x<X$_4$ the gate signal 14 is output from the AND-gate 56.

As in the above-mentioned system, a signal duration setting circuit 35 is provided for the second set of gate signals, while adders 40 to 43, comparators 49 to 52 and AND-gates 57 to 60 are provided for outputting the gate signals 21 to 24 from the respective AND-gates 57 to 60. In this portion of the circuit, the output of the adder 39 corresponds to the output of said starting count setting circuit 33 in the previously described portion. However, under some circumstances it is possible that some of the gate signals 11-14 or 21-24 are not generated. Particularly, the counter 32 is limited to counts of N$_0$ or less. When the numbers X$_0$, x$_1$ or X$_{01}$ are sufficiently large, the outputs of some of adders 36-43 may exceed N$_0$ and the results of comparisons by comparators 44-52 may be erroneous, since the count in counter 32 cannot reach te threshold numbers X$_{04}$, X$_{03}$, X$_{02}$, etc. Thus, gate signals 24, 23, 22, etc. would not be generated. Moreover, when X$_0$=0, x$_1$=N$_0$/4, the gate signals 11-14 correspond to Y$_g$, M$_g$, C$_g$ and K$_g$ as shown in FIG. 2 respectively, and it is impossible for gate signals 21-24 to be generated.

Figure 4:
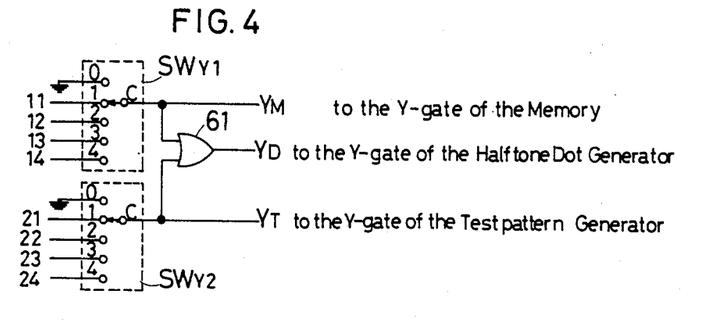
FIG. 4 is a circuit diagram for a circuit for selecting the section pulses.

FIG. 4 shows a selector which has a function of selecting an appropriate gate signal from out of the gate signals 11, 12, 13, 14, 21, 22, 23, and 24 according to desired color separation images and reproducing order of the color separation images. The selector further functions to distribute the selected gate signals to a halftone dot generator 71, to a memory 72 and to a test pattern generator 73 (mentioned later).

FIG. 4 shows a selector for the Y color. However, the same structure can be applied to the other color separation images M, C, K.

In other words, in FIG. 4 the gate signals 11 to 14 are input to a switch SW$_{Y1}$, and the signals to be distributed are selected as follows. The gate signals are distributed as a gate signal Y$_M$ to the memory 72 directly and to the halftone dot generator 71 as a gate signal Y$_D$ via OR-gate 61.

Output signals from a switch SW$_{Y2}$, which selects signals from gate signals 21 to 24, are similarly distributed to a test pattern generator 73 directly as a gate signal Y$_T$ and to the halftone dot generator 71 via the OR-gate 61 as a gate signal Y$_D$. If the Y color image is not required to be output in the aforesaid composition, respective 0 terminals of the switches SW$_{Y1}$, SW$_{Y2}$ are selected. Ordinarily terminal 1 of the switch SW$_{Y1}$ is selected to output the gate signal 11 for a Y color image, terminal 2 of the switch SW$_{M1}$ is selected to output the gate signal 12 for an M color image, terminal 3 of the switch SW$_{C1}$ is selected to output the gate signal 13 for a C color image, and terminal 4 of the switch SW$_{K1}$ is selected to output the gate signal 14 for a K color image.

In this case (X$_0$=(0) , x$_1$=N/4), color separation images shown as Areas 1 and 2 of FIG. 1(a) are obtained.

A recorded image shown in Part II of Area 4 of FIG. 1(b) can be obtained by selecting terminal 1 of the switch SW$_{Y1}$ and respective terminals 0 of the switches SW$_{M1}$, SW$_{C1}$, and SW$_{K1}$. Part III of Area 4 of FIG. 1(b) can be obtained by selecting terminal 2 of the switch SW$_{Y1}$, and respective terminals 0 of the switches SW$_{M1}$, SW$_{C1}$, and SW$_{K1}$. Part IV of Area 4 of FIG. 1(b) can be obtained by selecting terminal 0 of the switch SW$_{Y1}$, terminal 3 of the switch SW$_{M1}$, terminal 4 of the switch SW$_{C1}$ and terminal 0 of the switch SW$_{K1}$. In said manner, the gate signals 11, 12, 13, 14, 21, 22, 23, and 24 are output through the switches SW$_{Y1}$, SW$_{Y2}$, SW$_{M1}$, SW$_{M2}$, SW$_{C1}$, SW$_{C2}$, SW$_{K1}$, and SW$_{K2}$ (the latter six switches are not shown in the drawings) to the halftone dot generator 71, to the memory 72 and to the test pattern generator 73 as gate signals Y$_D$, Y$_M$, Y$_T$, M$_D$, M$_M$, M$_T$, C$_D$, C$_M$, C$_T$, K$_D$, K$_M$, and K$_T$.

Figure 5:
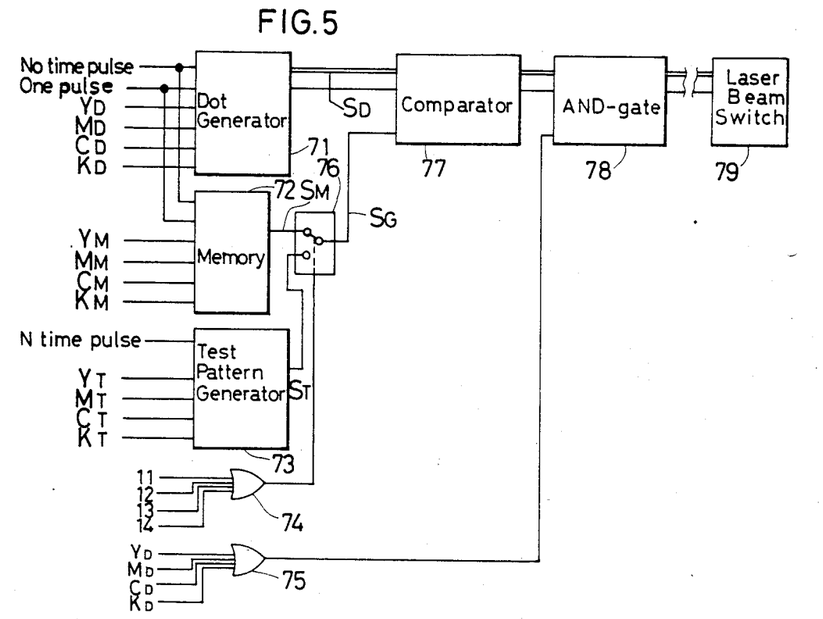
FIG. 5 is a circuit diagram for a circuit for synthesizing picture signals to be output.

The halftone dot generator 71 shown in FIG. 5 generates a signal which can be used for forming dots on a full surface of a film by using N$_0$ time pulses and one time pulse. Dots for each color image are made by using a pulse which has a certain duration upon command of analog gate signals S$_D$ for forming dots, which signals S$_D$ are input to a comparator 77. The comparator 77 compares the signal S$_D$ to an image analog signal S$_G$ and outputs a high-low signal which becomes "H" (high) when the signal S$_D$ is smaller.

The output signal of comparator 77 is input to a laser beam switch 79 via an AND-gate 78 as an image signal to turn on or off the switch 79.

Finally, several laser beams which are modulated by the image analog signal record the halftone dots on a film. The analog signal $S_M$, which is a seriated signal composed of image signals Y, M, C, and K stored in the memory 72 as shown in FIG. 2(e) I II III and IV, is output at command of the signals $Y_M$, $M_M$, $C_M$, $K_M$, coming from the selector shown in FIG. 4. When more than one of the gate signals 11, 12, 13, and 14 exist(s), an OR-gate 74 outputs a high ("H") signal which turns on an analog switch 76 to pass the analog signal $S_M$ from the memory 72 to comparator 77.

A test pattern generator 73 can output an analog signal $S_T$ formed from a digital signal produced from a saw-tooth wave, gradated wave, and a constant signal at command of the N time pulse and the gate signals $Y_T$, $M_T$, $C_T$, $K_T$, by using the counter and other circuit components through digital-analog conversion. When gate signals 11 to 14 do not exist, the output signal of the OR-gate 74 becomes "L" (low) to pass the analog signal $S_T$ through the analog switch 76 to the comparator 77.

Figure 6:
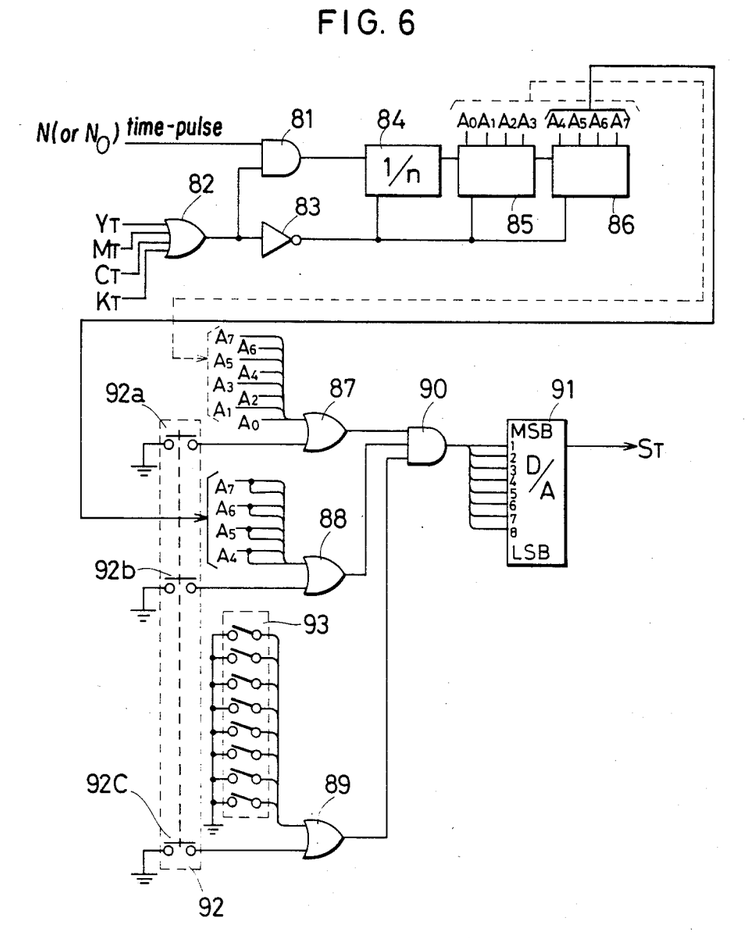
FIG. 6 is a test pattern generator.

FIG. 6 shows an embodiment of the test pattern generator 73. In the embodiment, a saw-tooth wave, a gradated wave, and a constant signal are provided as test pattern signals by a switch 92 wherein 92a, 92b, and 92c correspond to above-mentioned waves respectively.

In FIG. 3, as the comparators 44 to 52 can't judge equality, each of the gate signals 21, 22, 23, and 24 are all "L" (low) when the counted numbers in the counter 32 are $X_{01}$, $X_{02}$, $X_{03}$, or $X_{04}$ respectively. These gate signals 21, 22, 23, and 24 become gate signal(s) $Y_T$ ($M_T$, $C_T$, $K_T$ being not shown in the drawings) through the switch(es) $SW_{Y2}$, ($SW_{M2}$, $SW_{C2}$, $SW_{K2}$ being not shown in the drawings) to be input to an OR-gate 82 shown in FIG. 6. A low output signal from the OR-gate makes the output of an inverter 83 "H" (high) which resets counters 84, 85, and 86. That is, the counters 84, 85, and 86 are reset to "0" when the counted numbers are $X_{01}$, $X_{02}$, $X_{03}$, or $X_{04}$.

When the N time pulse is input to an AND-gate 81, and when at least one of the gate signals $Y_T$, $M_T$, $C_T$, or $K_T$ is "H", the N time pulse is output from the AND-gate 81 to a counter 84. If a frequency of the N time pulse is too high, it must be reduced to N/n (where n is a positive integer) to be input to the counters 85, and 86. If the frequency of the N time pulse is too low, an $N_0$ pulse can be input to the counters 85, 86. When a switch 92b for the gradated signals is turned on, signals $A_4$, $A_5$, $A_6$, and $A_7$ from the counter 86 are input via an OR-gate 88 and via an AND-gate 90 to a digital/analog converter 91 which outputs an analog signal $S_T$.

In this example, the 4 bit signal 21 is selected in the switch $SW_{Y2}$, and is input as a gate signal $Y_T$ to the digital/analog converter 91.

When the gate signal 21 is selected in the switch $SW_{Y2}$, it is input as a gate signal $Y_T$ to the digital/analog converter 91 to output a test pattern signal Y. Similarly, test pattern signals M, C, K can be obtained by using respective gate signals 22, 23, 24.

When a switch 92a for the saw-tooth signal of the selector 92 is turned on, signals $A_0$ to $A_7$ from the counters 85, 86 are input to the digital/analog converter 91 to output an analog signal $S_T$ having 256 gradations, which can be regarded as a saw-tooth signal.

When a switch 92c of the selector 92 is turned on for the constant signal and optional ones of eight switches of a level selector 93 are selected, a constant signal corresponding to the selected switches is output from the digital/analog converter 91 as an analog signal $S_T$. Though this analog signal $S_T$ is generated independently of the gate signals 21, 22, 23, 24 and the output signals of the counters 85, 86, the signal is controlled by the analog switch 76 and the AND-gate 78 and is provided as an input to the laser beam controller 79 only when the gate signals $Y_T$, $M_T$, $C_T$, $K_T$ are selected.

When $X_0$, $x_1 = 0$ and $x_{01} < N_0/4$ in FIG. 3, the sawtooth signal, the gradated signal, the constant signal are input to the laser beam controller 79 as shown in FIG. 7(b).

The AND-gate 78 is controlled by the output signal of the OR-gate 75, because the AND-gate 78 is necessary only to output the image signals $A'_Y$, $B'_Y$, $C'_M$, and $C'_C$ as shown at II, III, and IV in FIG. 2(e), which eventually halt the other signals in order to provide unexposed areas.

Area 7 of FIG. 1(f) corresponds to the gate signals 11, 12, 13, 14, 21, 22, 23, and 24. Among them, the gate signals 21 to 24 are input to the test pattern generator 73 and output as the analog signal $S_T$ via the analog switch 76 to the comparator 77. As a result, test pattern signals Y, M, C, and K are output to produce a pattern as in the Area 7 of FIG. 1(f), which shows an advantageous effect of the invention.

As the halftone dot generator 71, the memory 72, the test pattern generator 73, and the halftone dot producer using laser beam are not the main objects of this invention, no explanation thereof is provided herein.

The aforesaid is an embodiment of this invention, the method of this invention can be applied to a multiple exposing system.

As is mentioned above, the effect of this invention is to effectively use a whole film especially to utilize unused area by being recorded with desired images or test patterns.

I claim:

1. A method of recording color separation images in an image reproducing system which records a plurality of color separation images from scanning of a color original picture comprising the step of recording each of an optional number of color separation images on a film in an optional order and in optional positions during one scanning cycle of recording according to section pulses which divide one scanning cycle into a plurality of time sections.

2. In a system for recording color separation images in an image reproducing system which records a plurality of color separation images including means for scanning of a color original picture and producing the color separation images, the improvement comprising:

(a) a means for generating section pulses which divide one scanning cycle of a recording means in an arbitrary manner;

(b) a selector means which selects and distributes said section pulses to an image output device for selecting between image signals and test pattern signals for reproduction and for determining an arbitrary arrangement therebetween.

3. In a color separation image reproduction apparatus including scanning means, memory means for storing sets of color separation images obtained by scanning an original and recording means for recording said color separation images on a record medium, the improvement comprising:

maximizing means for maximizing utilization of said record medium, including positioning means for positioning record areas corresponding to said color separation images on said record medium to minimize unused area on said record medium, and selecting means for selecting for recording on said record areas an arbitrary subset of a set of said color separation images for an original.

4. An improved image reproduction apparatus as recited in claim 3 further comprising dividing means for dividing said record medium into different sized record areas corresponding to different sizes of different color separation images for recording said different color separation images thereon.

5. An improved image reproduction apparatus as recited in claim 3 wherein said maximizing means further includes ordering means for arranging said record areas for each of said color separation images in an arbitrary order on said record medium.

6. An improved image reproduction apparatus as recited in claim 4 wherein said maximizing means further includes means for recording each of a plurality of color separation images and test patterns at arbitrarily selected image sizes at arbitrarily selected locations on said record medium using electronically generated halftone dot patterns.

7. An improved image reproduction apparatus as recited in claim 5 wherein said maximizing means further includes means for recording each of a plurality of color separation images and test patterns at arbitrarily selected locations on said record medium using electronically generated halftone dot patterns.

8. An improved image reproduction apparatus as recited in claim 5 wherein said positioning means, said selecting means and said ordering means comprise section pulse generating means for generating a plurality of section pulses dividing a recording scanning cycle for selecting different record areas of said record medium positioned to minimize unused area on said record medium and for recording said arbitrary subset of said set of color separation images in an arbitrary order thereon.

9. An improved image reproduction apparatus as recited in claim 8 wherein said section pulse generating means comprises second selecting means for selecting between a color separation image and a test pattern signal for recording on said record areas of said record medium.

10. An improved image reproduction apparatus as recited in claim 8 wherein said section pulse generating means comprises first setting means for setting timing of a first section pulse representing a recording start signal for an area to be recorded upon, second setting means for setting time durations of said section pulses to represent a length in the scan direction of the area to be recorded upon, and adding means for determing starting times and durations for the section pulses in accordance with said first and second setting means.

11. An improved image reproduction apparatus as recited in claim 10 wherein said adding means comprises a plurality of adders and said section pulse generating means further comprises comparing means for comparing outputs of respective adders with a count of pulses dividing said scanning cycle for producing respective ones of said section pulses.

12. An improved image reproduction apparatus as recited in claim 3 wherein said record medium comprises photosensitive film and said recording means comprises laser means for exposing said photosensitive film to said color separation images.

13. An improved image reproduction apparatus as recited in claim 3 wherein said unused area comprises unrecorded areas of said record medium.

14. A method of electronically reproducing images wherein color separation data of Yellow (Y), Magenta (M), Cyan (C) and Black (K) color separations obtained by scanning an original are stored in a memory and then a photosensitive film is exposed to a laser beam controlled by a signal obtained by respectively comparing the said color separation data with corresponding halftone dot data generated by a halftone dot generator comprising the steps of:

(a) (i) obtaining a one-time pulse signal representing each revolution of a recording drum and (ii) obtaining an N-time pulse signal representing positions of the recording drum in a main scanning direction by a plurality of pulses output between occurrences of the one-time pulse signal;

(b) outputting from a section pulse generation means section pulses corresponding to at least one of the color separations Y, M, C and K according to the one-time pulse signal and the N-time pulse signal, said section pulses having a duration corresponding to a length in the main scanning direction of the corresponding color separation;

(c) obtaining from a selecting means (i) a first gate signal for controlling an output of the halftone dot generator in correspondence with each of the color separations and (ii) a second gate signal for controlling an output of the memory in correspondence with each of the color separations to be recorded according to each of the section pulses obtained in the step (b); and (d) (i) from the halftone dot generator obtaining a halftone dot data corresponding to the color separation according to the first gate signal and (ii) from the memory obtaining the color separation data corresponding to the color separation according to the second gate signal.

15. A method of electronically reproducing images wherein color separation data of Yellow (Y), Magneta (M), Cyan (C) and Black (K) color separation obtained by scanning an original are stored in a memory and then a photosensitive film is exposed to a laser beam controlled by a signal obtained by respectively comparing the color separation data or test pattern data obtained from a test pattern generator with corresponding halftone dot data generated by a halftone dot generator comprising the steps of:

(a) (i) obtaining a one-time pulse signal representing each revolution of a recording drum and (ii) obtaining an N-time pulse signal representing positions of the recording drum in a main scanning direction by a plurality of pulses output between occurrences of the one-time pulse signal;

(b) outputting from a section pulse generation means section pulses corresponding to at least one of the color separations Y, M, C and K according to the one-time pulse signal and the N-time pulse signal, said section pulses having a duration corresponding to a length in the main scanning direction of the corresponding color separation;

(c) obtaining from a selecting means (i) a first gate signal for controlling an output of the halftone dot generator in correspondence with each of the color separations, (ii) a second gate signal for controlling an output of the memory in correspondence with each of the color separations to be recorded according to each of the section pulses obtained in the step (b); and (iii) a third gate signal for controlling an output of the test pattern generator in correspondence with each of the color separations; and (d) (i) from the halftone dot generator obtaining a halftone dot data corresponding to the color separation according to the first gate signal (ii) from the memory obtaining the color separation data corresponding to the color separation according to the second gate signal, and (iii) from the test pattern generator obtaining the test pattern data corresponding to the color separation according to the third gate signal.

16. An apparatus for electronically reproducing images wherein color separation data of Yellow (Y), Magenta (M), Cyan (C) and Black (K) color separations obtained by scanning an original are stored in an image memory and then a photosensitive film is exposed to a laser beam controlled by a signal obtained by respectively comparing the said color separation data with corresponding halftone dot data generated by a halftone dot generator comprising:

(a) an encoding means for (i) providing a one-time pulse signal representing each revolution of a recording drum and (ii) providing an N-time pulse signal representing positions of the recording drum in the main scanning direction by a plurality of pulses output between occurrences of the one-time pulse signal;

(b) a section pulse generation means for outputting section pulses corresponding to at least one of the color separations Y, M, C and K according to the one-time pulse signal and the N-time pulse signal, the section pulse generation means being operable for setting (i) the duration of the section pulse and (ii) an interval between an occurrence of the one-time pulse input thereto and an occurrence of the first section pulse; and (c) a selecting means comprising four switch means for said four color separations, each of said switch means operable to select section pulses for outputting (i) a first gate signal for making the halftone dot generator output data correspond to a specific color separation and (ii) a second gate signal for making data output from the image memory correspond to a specific color separation.

17. An apparatus as recited in claim 16 in which the section pulse generation means comprises:

(a) a counting means for counting the frequency of an $N_0$ time pulse signal obtained from the N-time pulse signal by increasing the frequency thereof to obtain a pulse count number x;

(b) a recording start point setup means for setting the counting means to a count number $X_0$ corresponding to a recording start point of a color separation to be recorded first in the main scanning direction;

(c) a length setup means for setting the counting means to a count number $x_1$ coresponding to the length of the color separation to be recorded first in the main scanning direction;

(d) a summing means for respectively carrying out additions $X_1 = X_0 + x_1$, $X_2 = X_1 + x_1$, $X_3 = X_2 + x_1$ and $X_4 = X_3 + x_1$ in cascade by being given the values $X_0$ and $x_1$; and (e) an outputting means for outputting section pulses respectively when $X_0 < x < X$, $X < x < X_2$, $X_2 < x < X_3$, and $X_3 < x < X_4$.

18. An apparatus as recited in claim 17 in which said selecting means comprises:

(a) a terminal group composed of a plurality of terminals each connected to receive as an input a corresponding section pulse and further including a grounded terminal;

(b) a switching device for selecting one terminal out of said group of terminals; and (c) a distributing contact means which distributes signals output from said switching device to obtain the first and second gate signals.

19. An apparatus for electronically reproducing images wherein color separation data of Yellow (Y), Magenta (M), Cyan (C) and Black (K) color separations obtained by scanning an original are stored in an image memory and then a photosensitive film is exposed to a laser beam controlled by a signal obtained by respectively comparing the color separation data with a corresponding halftone dot data generated by a halftone dot generator or with test pattern data obtained from a test pattern generator comprising:

(a) an encoding means for (i) providing a one-time pulse signal representing each revolution of a recording drum and (ii) providing an N-time pulse signal representing positions of the recording drum in the main scanning direction by a plurality of pulses output between occurrences of the one-time pulse signal;

(b) a section pulse generation means for outputting section pulses corresponding to at least one of the color separations Y, M, C and K according to the one-time pulse signal and the N-time pulse signal, the section pulse generation means being operable for setting (i) the duration of the section pulse and (ii) an interval between an occurrence of the one-time pulse input thereto and an occurrence of the first section pulse and;

(c) a selecting means comprising a first group of four switch means for said four color separations, each of said switch means operable to select section pulses for outputting (i) a first gate signal for making the halftone dot generator output data correspond to a specific color separation and (ii) a second gate signal for making data output from the image memory correspond to a specific color separation, and a second group of four switch means for said four color separations, each switch means of said second group operable to select section pulses to output (iii) a third gate signal for making the halftone dot generator output data correspond to a specific color separation and (iv) a fourth gate signal for making the test pattern generator ouput data correspond to a specific color separation to be recorded.

20. An apparatus as recited in claim 19 in which the section pulse geneation means comprises:

(a) a counting means for counting the frequency of an $N_0$ time pulse signal obtained from the N-time pulse signal by increasing the frequency thereof to obtain a pulse count number;

(b) a recording start point setup means for setting the counting means to a count number $X_0$ corresponding to a recording start point of a color separation to be recorded first in the main scanning direction;

(c) a first length setup means for setting the counting means to a count number $x_1$ corresponding to the length of the color separation to be recorded first in the main scanning direction;

(d) a second length setup means for setting the counting means to a count number $x_{01}$ corresponding to the length of a color separation to be recorded second in the main scanning direction;

(e) a first summing means for respectively carrying out additions $X_1=X_0+x_1$, $X_2=X_1+x_1$, $X_3=X_2+x_1$ and $X_4=X_3+x_1$ in cascade by being given the values $X_0$ and $x_1$;

(f) a second summing means for respectively carrying out additions $X_{01}=X_4+X_{01}$, $X_{02}=X_{01}+x_{01}$, $X_{03}=X_{02}+X_{01}$ and $X_{04}=X_{03}+X_{01}$ in cascade by being given the values $X_4$ and $x_{01}$;

(g) a first outputting mean for outputting a first group of section pulses corresponding to the first and the second gate signals, when $X_0<x<X_1$, $X_1<x<X_2$, $X_2<x<X_3$ and $X_3<x<X_4$; and (h) a second outputting means for outputting a second group of section pulses corresponding to the third and the fourth gate signals when $X_4<x<X_{01}$, $X_{01}<x<X_{02}$, $X_{02}<x<X_{03}$ and $X_{03}<x<X_{04}$.

21. An apparatus as recited in claim 20 in which said selecting means comprises:

(a) a first terminal group composed of a plurality of terminals each connected to receive as an input one of a first group of section pulses and further including a grounded terminal;

(b) a first switching device for selecting one terminal out of said first group of terminals;

(c) a first distributing contact means which distributes signals output from said first switching device to obtain the first and second gate signals;

(d) a second terminal group composed of a plurality of terminals each connected to receive as an input one of a second group of section pulses and further including another grounded terminal;

(e) a second switching device for selecting one terminal out of said second group of terminals; and (f) a second distributing contact means which distributes signals output from said second switching device to obtain the third and fourth gate signals.

* * * * *